United States Patent
Heck et al.

(10) Patent No.: US 6,868,632 B1
(45) Date of Patent: Mar. 22, 2005

(54) FISHERS LURE

(75) Inventors: John Scott Heck, 491 S. 525 West, Columbus, IN (US) 47201; Lonnie Dean Lynch, North Vernon, IN (US)

(73) Assignee: John Scott Heck, Columbus, IN (US)

( * ) Notice: Subject to any disclaimer, the term of this patent is extended or adjusted under 35 U.S.C. 154(b) by 0 days.

(21) Appl. No.: 10/238,379

(22) Filed: Sep. 10, 2002

Related U.S. Application Data
(60) Provisional application No. 60/323,744, filed on Sep. 20, 2001.

(51) Int. Cl.[7] .............................................. A01K 83/02
(52) U.S. Cl. ....................................................... 43/37
(58) Field of Search ................................ 43/35, 36, 37

(56) References Cited

U.S. PATENT DOCUMENTS

| | | | | |
|---|---|---|---|---|
| 783,253 A | * | 2/1905 | Flegel | 43/37 |
| 834,307 A | * | 10/1906 | Landon | 43/37 |
| 1,197,820 A | * | 9/1916 | Guise | 43/35 |
| 1,437,694 A | * | 12/1922 | Traver | 43/35 |
| 1,462,949 A | * | 7/1923 | Walls | 43/35 |
| 1,479,652 A | * | 1/1924 | Cranstone | 43/35 |
| 1,609,151 A | * | 11/1926 | Bruenig | 43/37 |
| 1,638,923 A | * | 8/1927 | Danielson | 43/35 |
| 1,672,498 A | * | 6/1928 | Otto | 43/37 |
| 1,791,083 A | * | 2/1931 | Pike | 43/37 |
| 1,803,561 A | * | 5/1931 | Rodin | 43/37 |
| 2,256,088 A | * | 9/1941 | Hogan | 43/35 |
| 2,325,247 A | * | 7/1943 | Helfenstein | 43/36 |
| 2,841,913 A | * | 7/1958 | Pearson | 43/37 |
| 3,059,371 A | * | 10/1962 | Haynie, Sr. | 43/35 |
| 3,410,019 A | * | 11/1968 | Landi | 43/35 |
| 3,802,114 A | * | 4/1974 | Diebold | 43/37 |
| 3,890,735 A | * | 6/1975 | Serrill | 43/36 |
| 4,237,643 A | * | 12/1980 | Simons | 43/35 |
| 4,873,781 A | * | 10/1989 | Bates | 43/35 |
| 5,526,602 A | * | 6/1996 | Day, Sr. | 43/37 |
| 5,890,314 A | * | 4/1999 | Peters | 43/36 |

* cited by examiner

Primary Examiner—Kurt Rowan

(57) ABSTRACT

A fishers lure comprises a body, at least one spine with a tip, a pivot pin about which each spine pivots, a trigger which serves to engage each spine, so when a fish takes the lure, the trigger is disengaged from each spine, permitting each spine to extend outward and engage the fish. The body serves as a shank of a hooking mechanism. The body and spine serve as the hooking mechanism with the tip of the spine forward of the pivot pin resulting in a relatively large hooking mechanism for a given size body.

11 Claims, 6 Drawing Sheets

FISHERS LURE

CROSS REFERENCE TO RELATED APPLICATIONS

U.S. Provisional Application for Patent 60/323,744, filed Sep. 20, 2001, with the same title, "Fishers Lure" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

The present invention is a fishing lure.

2. Background Information

In searching the internet, the following prior art was uncovered:

| | | |
|---|---|---|
| 2,576,532 | Nov. 27, 1951 | Nudell |
| 5,440,830 | Aug. 15, 1995 | Smith |
| 5,564,216 | Oct. 15, 1996 | McMillan |
| 5,890,314 | Apr. 9, 1999 | Peters |

The above lures have hooks that spring outward when a fish takes the bait. All forces generated by the fish or a fisher tend to force the hooks inwards towards an initial, prior to actuation, position. Also, the hooks must be relatively small as compared to the size of the lure.

A fish swallowing any of the above lures suffers the hooks to be engaged sufficiently deep in the throat of the fish that the hooks engage vital organs of the fish, causing irreparable damage to the vital organs of the fish. If the fish is too small to keep, returning it to the water does not result in survival of the fish.

Some of the prior art make the claim of being a weed-less lure in that the lure is less apt to snag weeds.

As will be seen in the subsequent description, the preferred embodiment of the present invention overcomes these and other shortcomings of existing fishing lures.

SUMMARY OF THE INVENTION

The present invention, in the preferred embodiment, is a fishing lure comprising a body, at least one spine, a means of biasing the at least one spine outward, a trigger, pivot pins, buoyancy chambers, and a leader.

The body comprises a top half and a bottom half, joined together, in the preferred embodiment, by an adhesive. The top half comprises male protrusions that mate with recesses in the bottom half.

In operation, the at least one spine is held retracted by the trigger attached to the leader, said leader being attachable to a fishing line, so that when a fish strikes on said lure, the trigger is detached from the at least one spine so the at least one spine is released to a position where the fish will be caught by the spine. A spring serves as a means of biasing the trigger against the at least one spine.

A tension band may be used to bias the at least one spine outward.

DESCRIPTION OF THE PREFERRED EMBODIMENTS

Figure 1:
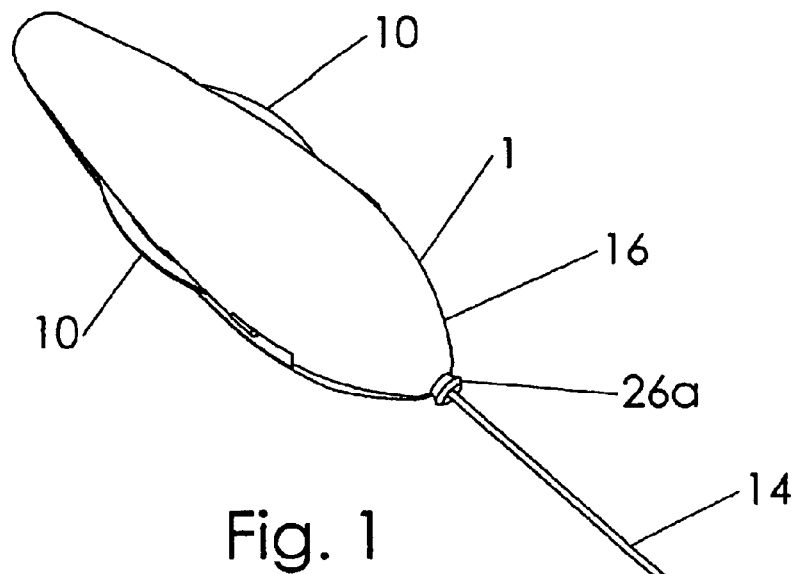
FIG. 1 illustrates the preferred embodiment of the present invention, a fishers lure, prior to spine release.
Figure 1A:
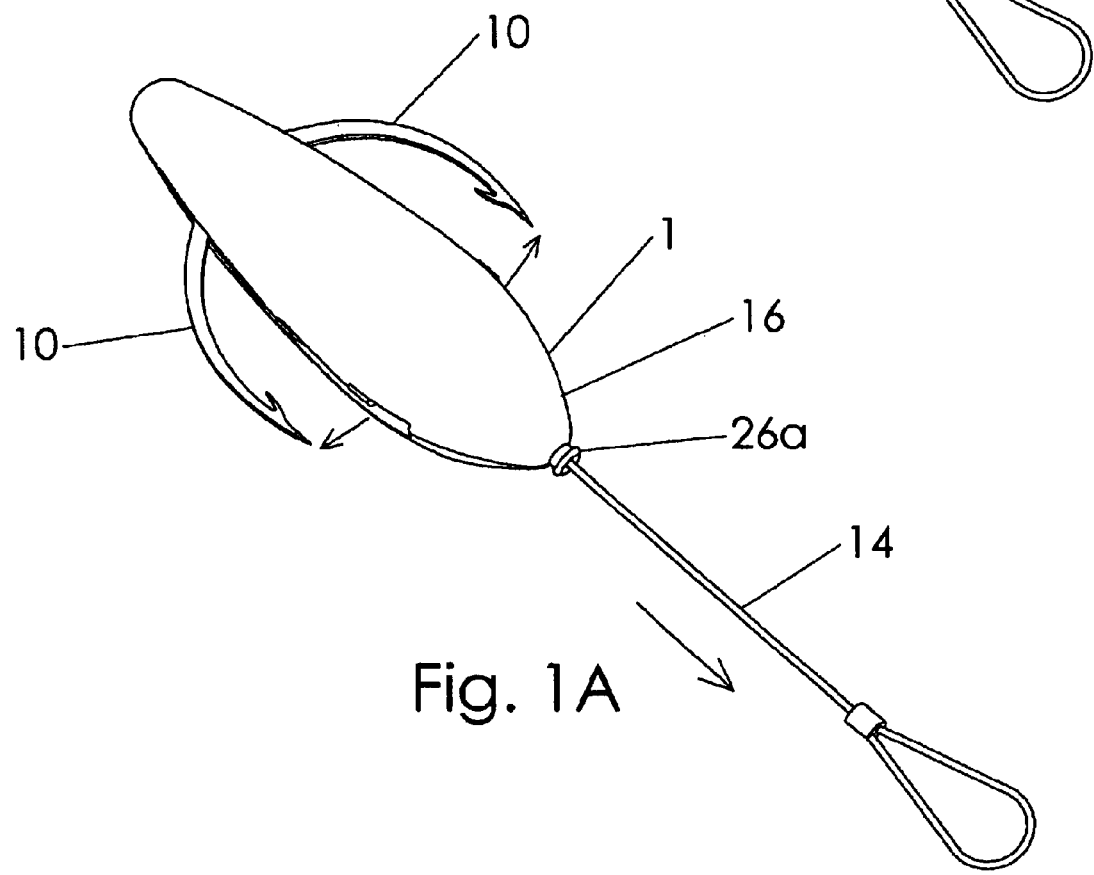
FIG. 1A illustrates the fishers lure with spines released.

Referring to FIGS. 1 and 1A, the preferred embodiment of the present invention, a fisher lure 1 comprises at least one spine 10, a body 16, a liner insert 26A, and a leader 14, which, in the preferred embodiment of the present invention, is a flexible leader.

Outward movement of the at least one spine 10 is indicated by the arrows in FIG. 1A.

Figure 9:
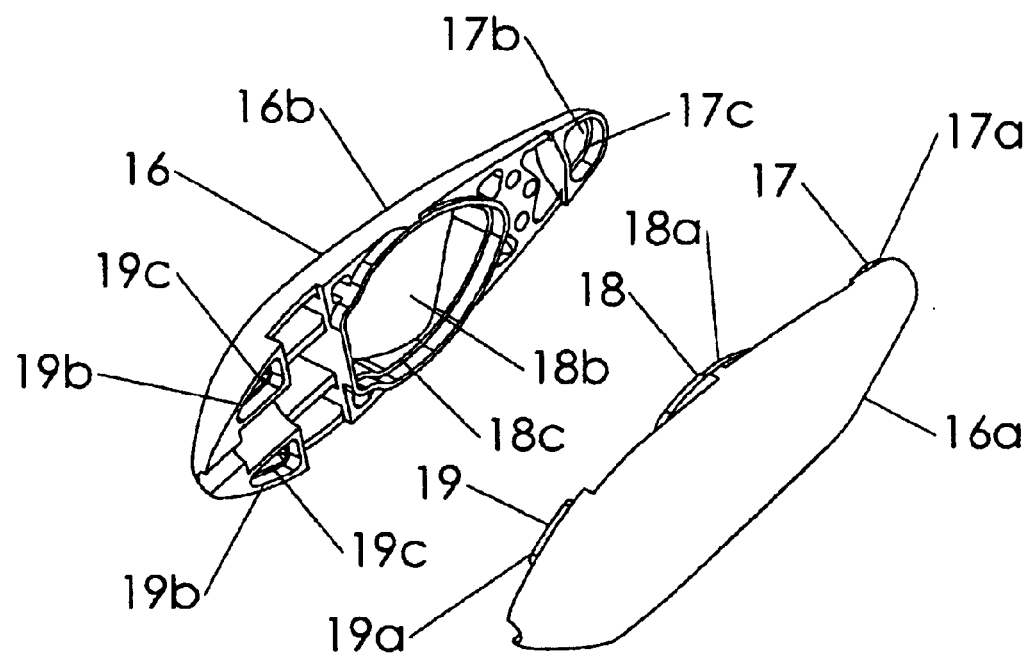
FIG. 9 illustrates the body halves prior to assembly.
Figure 9A:
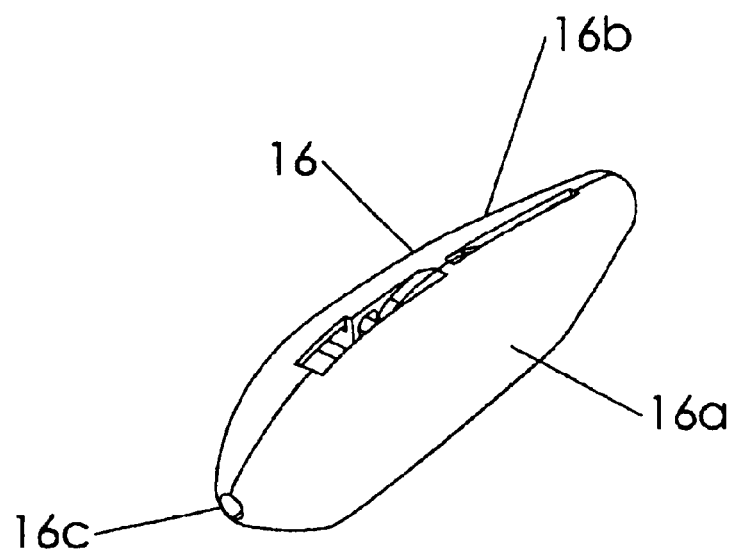
FIG. 9A illustrates the body halves mated together.

The body 16 comprises a body top half 16A and a body bottom half 16B, as indicated in FIGS. 9 and 9A.

Figure 2:
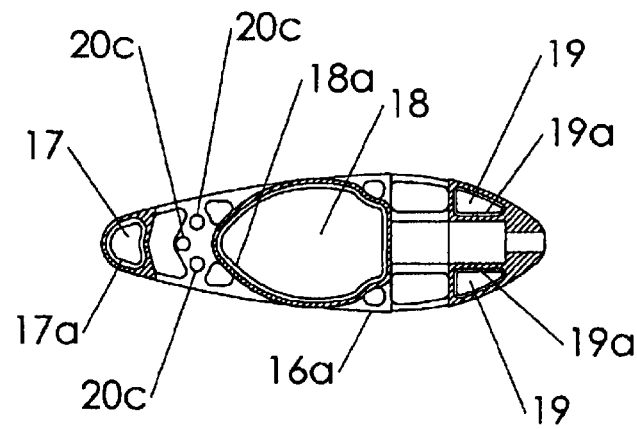
FIG. 2 illustrates a top body half of the fishers lure.
Figure 3:
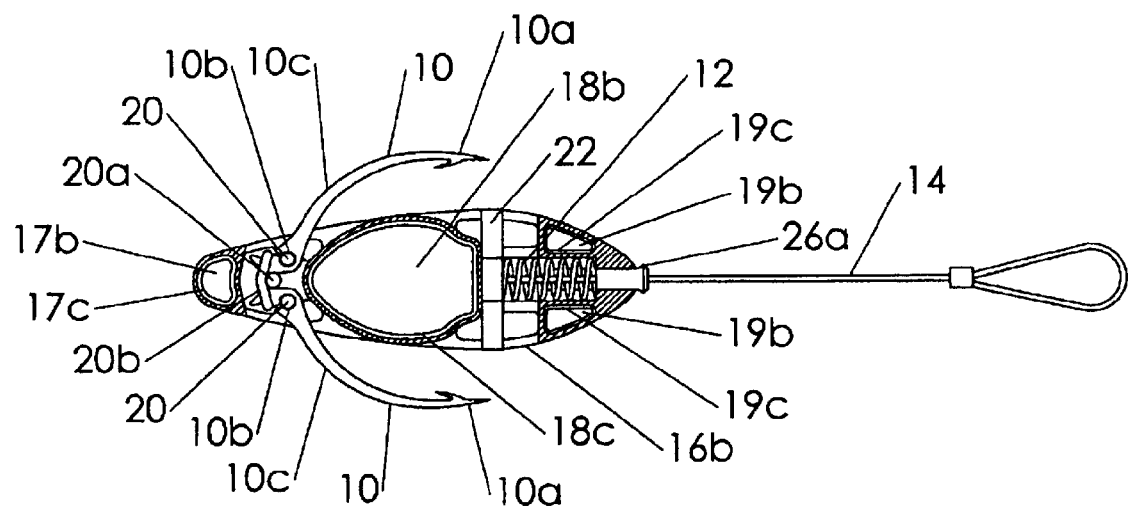
FIG. 3 illustrates a bottom body half with various components in place and spines released.
Figure 4:
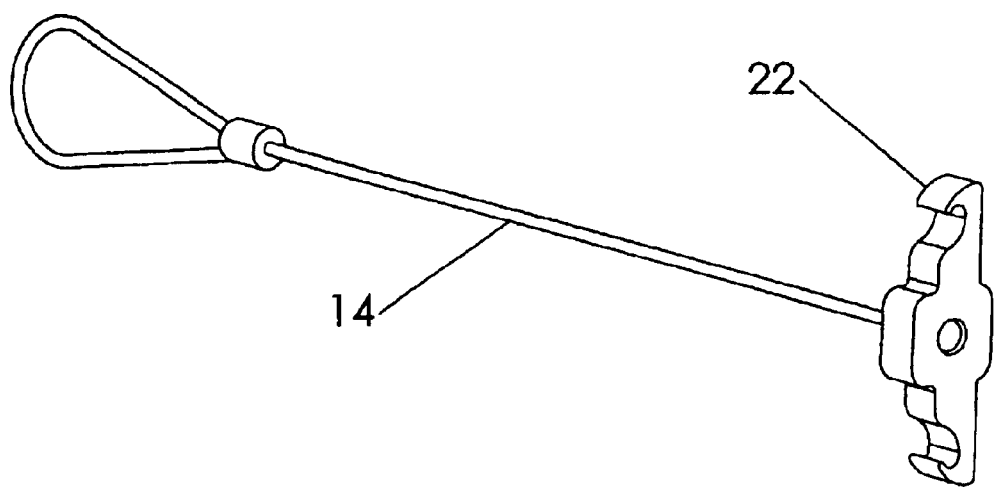
FIG. 4 illustrates a leader attached to a trigger.

Referring to FIGS. 2, 3, and 9:

a) the body top half 16a comprises an aft top chamber 17, an aft top chamber protrusion 17a, a main top chamber 18, a main top chamber protrusion 18a, forward top chambers 19, and forward top chamber protrusions 19a; and b) the body bottom half 16b comprises an aft bottom chamber 17b, an aft bottom chamber recess 17c, a main bottom chamber 18b, a main bottom chamber recess 18c, forward bottom chambers 19b, and forward bottom chamber recesses 19c.

Figure 7:
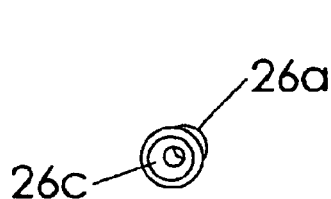
FIGS. 7, 7A and 7B are views of a liner insert.
Figure 7A:
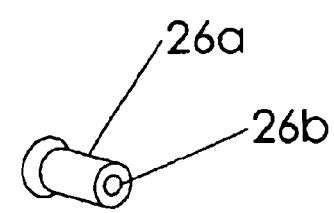
Figure 7B:
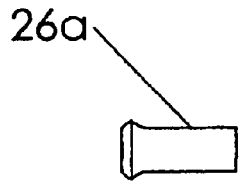

Referring to FIGS. 9 and 9A, when said body halves 16a and 16b are joined together to form the body 16, with a cavity 16c to accept the liner insert 26a (Ref. FIGS. 7, 7A and 7B), said chambers 17 and 17b mate together, by way of said protrusion 17a forming an air tight seal with said recess 17c, as do said chambers 18 and 18b, by way of said protrusion 18a forming an air tight seal with said recess 18c, as do said chambers 19 and 19b, by way of said protrusions 19a forming an air tight seal with said recesses 19c. The result of the above said air tight seal is that air contained within said chambers 17 and 17b, 18 and 18b, 19 and 19b create buoyancy which is imparted to the body 16 of the fishers lure 1.

Also illustrated in FIG. 2 are pin apertures 20c.

Referring to FIGS. 3, 6, 6A and 8, each spine 10 comprises a spine tip 10a, a pivot opening 10b, and an elongated body section 10c. Each pivot opening 10b cooperates with one of the pivot pins 20 to pivotally mount one of the spines 10, each of the spines 10 biased outward from the body 16 (Ref. also FIG. 1A) by a tension band 20b.

Also illustrated in FIG. 3 are the spines 10 which pivot about pivot pins 20, said spines 10 biased outward from the body 1 (Ref. FIG. 1A) by a tension band 20b.

Figure 8:
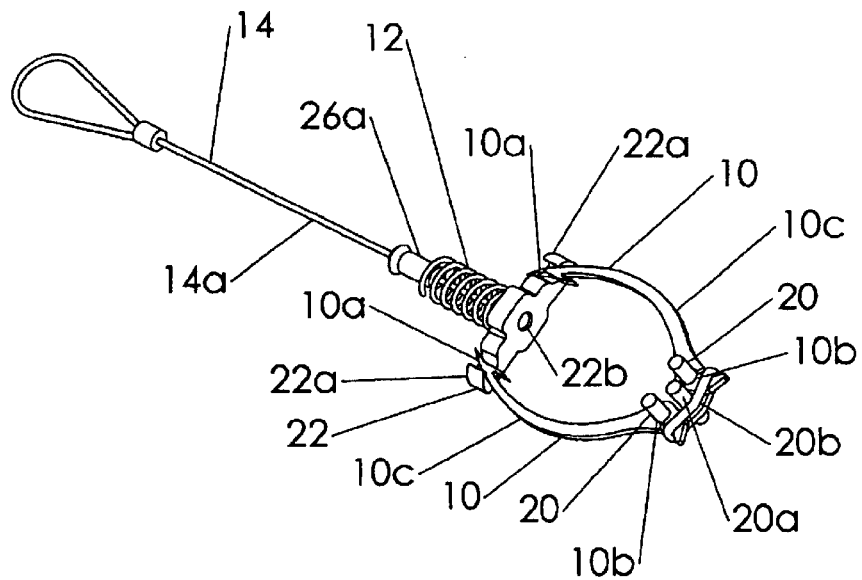
FIGS. 8 and 8A illustrate a leader subassembly.
Figure 8A:
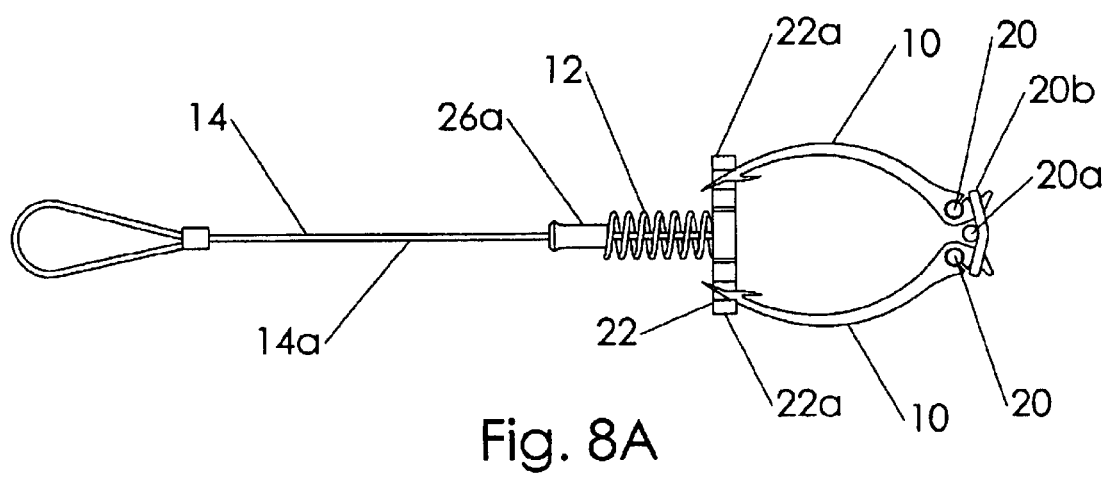

Referring to FIGS. 3, 8, and 8A, a leader assembly 14a is shown. The leader assembly 14a is shown by itself in FIGS. 8 and 8A, as well as laid in position in the body bottom half 16b in FIG. 3.

The leader assembly 14a comprises the leader 14, a liner insert 26a, a spring 12, the trigger 22, spines 10, pivot pins 20, a travel limit pin 20a, and the tension band 20b.

The leader 14 passes through an inlet chamfer 26c (Ref. FIG. 7B) and an aperture 26b (Ref. FIG. 7A) of the liner insert 26a (Ref. also FIGS. 7, 7A and 7B) and attaches to the trigger 22.

Referring to FIGS. 5, 5A, 8, and 8A, the trigger 22 comprises trigger catches 22a.

Figure 5:
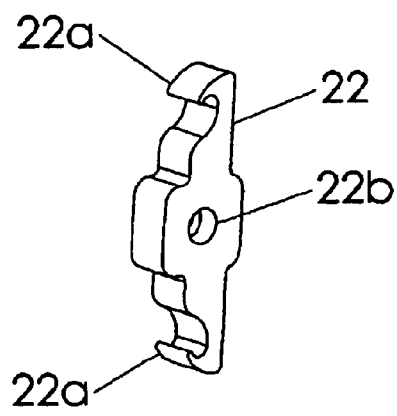
FIGS. 5 and 5A illustrate the trigger.
Figure 5A:
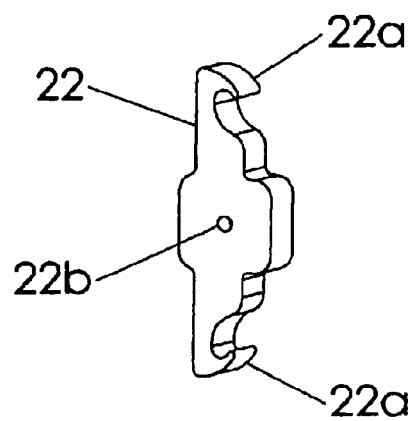
Figure 6:
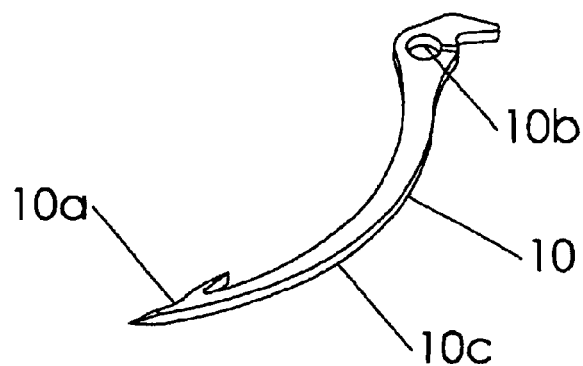
FIGS. 6 and 6A illustrate the spine.
Figure 6A:
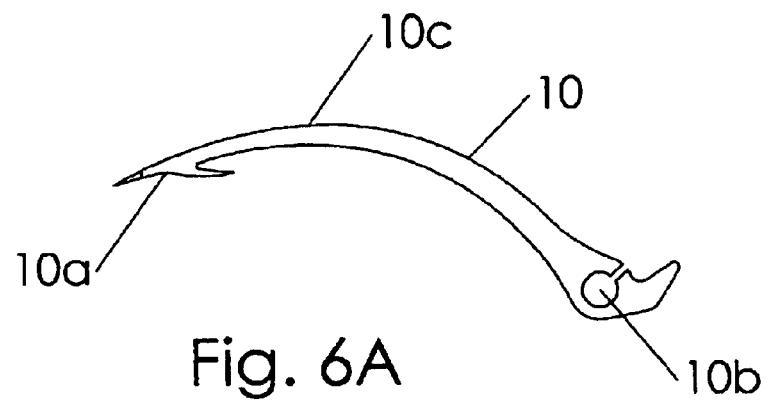

The trigger 22 further comprises a leader clearance 22b, as indicated in FIGS. 5, 5A, and 8.

When the fishers lure 1 is taken by a fish, the fish will pull against the leader 14 which will in turn unseat the trigger 22 which will then release the spines 10 which will then extend outwards, as indicated in FIG. 1A. The tension band 20b serves as a bias means urging the spines 10 outward. The travel limit pin 20a serves to limit the outward travel of the spines 10.

After the leader assembly 14a is in place in the body bottom half 16b, said pins 20 and 20a serve as locating pins for joining the body top half 16a to the body bottom half 16b.

Said pins 20 and 20a are rigidly attached to the body 16 when said halves 16a and 16b are joined together.

Said pins 20 serve also as locating pins for the spines 10.

The spring 12, the pins 20 and 20a, and the at least one spine 10 are of spring steel in the preferred embodiment of the present invention. However, as obvious to anyone skilled in the art, other materials would serve the intended purpose, albeit perhaps not as well.

The body 16 with extended spines 10, as shown in FIG. 1A serves as a hooking mechanism. The shank of a conventional hook is replaced by the body 16.

The body 16 with extended spines 10 replaces what is known in the trade as the "J" area of the conventional hook. The spines 10 do not retract under pressure, but tend to extend as set in a fish's mouth. Force on the fishers lure 1, exerted by a fish engaged by the fishers lure 1, is transmitted to and through the body 16, as opposed to force on a conventional hook that tends to be a weak link for prior art lures.

Each spine 10 of the fishers lure 1 is less likely to penetrate vital areas of the fish, as compared to the previously mentioned prior art, as each spine 10 is triggered when the fishers lure 1 is in the mouth of the fish.

Each spine tip 10a (Ref. FIG. 3) is forward of each spine pivot pin 20 of the body 16 (Ref. also FIG. 1A), said body 16 serving as bait, as opposed to hooks in the previously cited prior art that trail their bodies which serve as bait. As each spine tip 10a is forward of the spine pivot pins 20, a fishers lure 1 serves as a larger hook for a given body 16 serving as bait than does any of the previously cited prior art.

The elongated body section 10c on each spine 10 connects the pivot opening 10b to the spine tip 10a so that the spine tip 10a is located adjacent to the leader 14.

In the preferred embodiment of the present invention the leader 14 is a monofilament fishing line. The tension band 20b is an elastic band. A moldable plastic is the preferred material of construction for the body halves 16a and 16b, the liner insert 26a, and the trigger 22. Also, other materials will suffice, such as wood, epoxy or various metals like, but not restricted to steel, or aluminum.

An advantage of the fishers lure 1 is that it serves as what is known in the trade as a weed-less fishers lure.

Although the description above contains many specificities, these should not be construed as limiting the scope of the invention but as merely providing illustration of some of the presently preferred embodiments of this invention.

It will be obvious to those skilled in the art that modifications may be made to the embodiment described above without departing from the scope of the present invention. Thus the scope of the invention should be determined by the appended claims in the formal application and their legal equivalents, rather than by the examples given.

What is claimed is:

1. A fishers lure comprising:
   a) a body having a first end and a second end;
   b) a first spine and a second spine each comprising a spine tip at a first end of each spine;
   c) at least one pivot pin coupled to the body at the second end of the body about which each spine pivots;
   d) a trigger which serves to engage the spine tip of each of the first and second spines, the trigger including a first slot formed to receive the spine tip of the first spine therein and a second slot formed to receive the spine tip of the second spine therein;
   e) a flexible leader connected to said trigger and positioned at the first end of the body, so when a fish takes the lure, the trigger is disengaged from each spine, permitting each spine to extend outward from the body engaging the fish;
   f) a tension band coupled to and positioned to extend between a second end of each spine, the tension band being mounted behind the pivot pin toward the second end of the body to bias each spine to pivot about the pivot pin to move the spine tip of each spine in an outward direction away from the body; and
   g) a central, air tight chamber defined by an interior wall of the body and positioned between the trigger and the pivot pin;
   whereby the body serves as bait for the fish;
   whereby the body serves as a shank of a hooking mechanism;
   whereby the body and each spine structurally serve as a hooking mechanism with the spine lip positioned forward of the pivot pin between the pivot pin and the leader throughout operation of the lure;
   resulting in a relatively large hooking mechanism for a given size body.

2. The fishers lure of claim 1 further comprising a means of biasing said trigger towards each spine.

3. The fishers lure of claim 2 wherein said means of biasing said trigger towards each spine comprises a spring.

4. The fishers lure of claim 1 wherein said fishers lure is a weed-less fishers lure.

5. A fishers lure for catching fish comprising:
   a body having a first end with a fishing leader coupled to said first end and a second end opposite said fishing leader;
   at least one pivotal spine including a first end having a spine tip and a second end spaced-apart from the first end;
   a pivot pin coupled to said body and said at least one spine at said second end of said body and said second end of said at least one spine;
   a trigger engaging the spine tip of said spine;
   a tension band coupled to the second end of the pivot pin and positioned behind the pivot pin toward the second end of the body to bias the spine to pivot about the pivot pin to move the spine tip of the spine in an outward direction away from the body;
   a central, air tight chamber defined by an interior wall of the body and positioned between the trigger and the pivot pin; and
   a spring positioned around the flexible leader and engaged with the trigger to bias said trigger into engagement with said spine tip of said spine;
   said spine having a first position wherein at least said spine tip is contained within said body and engaged with the trigger;

said spine having a second position wherein at least said spine tip is located outside said body and the spine is disengaged from the trigger;

wherein said fishing leader is attached to said trigger such that relative movement between the fishing leader and said body will disengage said trigger from said spine, releasing said spine to pivot from said first position to said second position;

wherein said spine is attached to said body at said pivot pin rigidly attached to said body and wherein said spine tip lies between said pivot pin and said leader in said first and said second position.

6. The fishers lure of claim 5 wherein a second spine with a second spine tip is mounted to a second pivot pin such that disengagement of said trigger releases both spines to pivot.

7. The fishers lure of claim 5 wherein said lure is weed-less when said spine is in said first position.

8. A fishers lure for catching fish comprising:

a body forming a cavity having a first end adjacent to a leader and a second end opposite said leader, a pivot pin rigidly attached to said body near said second end;

at least one spine having a spine tip located at a first end of the at least one spine and a pivot opening located at a second of end of the at least one spine and cooperating with said pivot pin to pivotally mount said at least one spine;

a central, air tight chamber defined by an interior wall of the body and positioned between an end of the leader and the pivot pin; and a tension band coupled to the second end of the at least one spine and positioned behind the pivot pin toward the second end of the body to bias the at least one spine to pivot about the pivot pin to move the spine tip of the at least one spine in an outward direction away from the body;

said at least one spine comprising an elongated body section connecting said pivot opening to said tip such that said tip is located between said pivot pin and said leader and adjacent to said leader.

9. The fishers lure of claim 8 further wherein:

said at least one spine has a first position wherein said at least one spine tip is contained within said body and a second position wherein said tip is outside said body;

a trigger is attached to said leader and said tip is in contact with said trigger when said at least one spine is in said first position.

10. The fishers lure of claim 8, further wherein:

a relative movement between said body and said leader compresses a spring releasing said tip from contact with said trigger to allow said at least one spine to pivot from said first position thereof to said second position.

11. The fishers lure of claim 8 further wherein:

a second spine, said second spine having a second tip, said second spine is mounted for movement on a second pivot pin such that release of said trigger allows both spines to pivot.

* * * * *